United States Patent [19]

Snyder

[11] Patent Number: 5,536,007
[45] Date of Patent: Jul. 16, 1996

[54] CAT GAME

[76] Inventor: Kirsten R. Snyder, 2892 E. Point Dr., Chesapeake, Va. 23321

[21] Appl. No.: 360,065

[22] Filed: Dec. 20, 1994

[51] Int. Cl.⁶ ........................................................ A63F 7/04
[52] U.S. Cl. .................. 273/118 R; 273/123 R; 119/702; 119/709
[58] Field of Search ........................... 273/108, 118, 273/123, 153 R; 119/702, 707

[56] References Cited

U.S. PATENT DOCUMENTS

| | | |
|---|---|---|
| D. 335,554 | 5/1993 | Conner. |
| 480,983 | 8/1892 | Wolf ............................ 273/153 R |
| 2,900,956 | 8/1959 | Hoffmann. |
| 3,488,052 | 1/1970 | Weisbecker ................... 273/153 R |
| 3,552,356 | 1/1971 | Rosenthal. |
| 3,648,403 | 3/1972 | Gommel. |
| 4,722,299 | 2/1988 | Mohr. |
| 5,009,193 | 4/1991 | Gordon. |
| 5,188,059 | 2/1993 | Rice. |

FOREIGN PATENT DOCUMENTS 467437  9/1914  France.

*Primary Examiner*—Raleigh W. Chiu
*Attorney, Agent, or Firm*—Griffin, Butler, Whisenhunt & Kurtossy

[57] ABSTRACT

A cat game (10) includes a rigid enclosed frame (16) having bottom and top edges (18, 20) and interior and exterior sides (22, 24), with the interior side defining an interior space (46). Rigid parallel flat bottom and top walls (38, 40) are attached at the interior side respectively adjacent the bottom and top edges of the frame for permanently enclosing the interior space. The flat top wall has nine holes (48a–i) therein and a spherical ball (14) is placed in the interior space through one of the holes. A distance between the flat top and bottom walls is substantially uniform and not greater than twice a diameter of the spherical ball and substantially all of the top holes have minimum dimensions that are greater than the diameter of the ball but less than 1.5 times the diameter of the ball. Most of the top holes are spaced a substantial distance from the frame.

1 Claim, 2 Drawing Sheets

CAT GAME

BACKGROUND OF THE INVENTION

This invention relates generally to toys and games for pets and specifically those which are suited for entertaining and exercising cats.

A number of cat toys and games have been suggested for entertaining and exercising cats and for providing enjoyment to their owners upon watching them play with such toys and games. For example, U.S. Pat. No. 3,648,403 to Gommel discloses a play toy for felines, dogs and children which includes a hollow housing having a removable top assembly (or cover) with a hole therein and a main body portion with a side hole therein. A small spherical toy, or ball, is inserted into the housing through either of the openings. A cat is expected to lift the housing so that the ball rolls to eventually register with one of the holes and falls out. It is hoped that the cat will then put the ball back into the housing. Although the toy of Gommel has many benefits and could provide cats with playful fun, it has the disadvantage that, in many cases, it requires human intervention to keep a game going. Also, this toy can be moved from place to place which could contribute to a disorderly house. Yet another difficulty with the toy of Gommel is that, because of its structure, it is often necessary for a human to become overly involved in order to initiate a game. Similarly, the ball can "hide" in areas within the housing that are not readily seen by the cat, so that a cat can lose interest.

U.S. Pat. No. 5,188,059 to Rice describes another amusement device for cats which includes a sidewall having a closed bottom and an open top, the top being covered by a non-rigid fabric which is stretched across it. The nonrigid fabric has one or more cut-out portions adjacent the sidewall and a middle opening of a size to permit insertion of a cat's paw therethrough. This amusement device appears to be sufficiently heavy and shaped such that it would be difficult for a cat to move. A ping pong ball is placed through one of the holes and cats reach through the holes to try to get the ball. Cats can push the ball through the center slit from under the fabric. Thus, a cat can get the ball. Rice writes that:

> The typical cat is instantly intrigued—it can hear the ball rolling around inside the box 3 and will dive and pounce on the ball as it appears in the corner holes 1.
>
> The invention is not merely a toy, but appeals to the cat's strategic nature in a formalized game of cat and mouse. The cat will attempt to "stalk" the ball from under the fabric or pounce on the ball as it appears in the corners. It provides exercise and entertainment for the animal, while owners are amused by the cat's antics as it stalks its prey.

Although Rice's amusement device has many benefits over the toy of Gommel, it still retains some of the disadvantages in that it requires, from time to time, human intervention to keep a game going. Further, it also appears that the amusement device of Rice would require an undue amount of help from a human to get a cat interested in it because there are not enough points at which the cat can see the ball rolling in an .interior thereof ("The cat only sees the ball when it rolls into a corner."). This disadvantage might also lead to a cat prematurely losing interest in Rice's device. Yet another difficulty with both the Rice amusement device and the toy of Gommel is that they appear to employ unduly light-in-weight balls which cannot develop sufficient momentum to keep them moving for long periods of time when no force is applied thereto. Further, such balls will not make sufficient noise to keep a cat's interest. Another difficulty with the devices of both of these patents is that they are difficult to manufacture and cannot be made with standard, off-the-shelf materials. The device of Rice, for example, has many different parts and it would be difficult to properly assemble its stretched non-rigid fabric to its sidewall in a standard manner. Also, the devices of these patents are not sufficiently aesthetically pleasing.

French patent (467,437) describes a dog bath which is somewhat similar in structure to the amusement device of Rice. In addition to the deficiencies described for the Rice device, the device of the french patent appears to be too deep in structure to allow a cat (or other animal) easy access to any ball placed in a housing thereof.

It is an object of this invention to provide a cat game which cannot be easily moved about in a house but which will entertain and exercise a cat for hours with no intervention from a human.

It is a further object of this invention to provide a cat game which easily catches the interest of a cat and entices the cat to play with it, with a minimum of human intervention.

It is yet another object of this invention to provide a cat game which provides cats with a great deal of sound and sight stimulation so as to continually intrigue them, thereby providing a continuous enticement to the cats.

It is a further object of this invention to provide such a cat game which is durable, pleasing to look at, can be easily mass produced of readily obtainable parts, and which is, therefore, relatively inexpensive to manufacture.

SUMMARY OF THE INVENTION

According to principles of this invention, a cat game includes a short, but wide, rigid enclosed frame having bottom and top edges and interior and exterior sides, with the interior side defining an interior space. Rigid, parallel, flat, bottom and top walls are attached adjacent the respective top and bottom edges of the frame so as to further enclose the interior space. The top wall has holes therein. A spherical ball is placed in the interior space through one of the holes. The holes, the spherical ball, and a distance between the bottom and top walls are positioned and sized such that the ball can pass through most of the holes, a cat can easily see the ball roll pass the holes, a normal-size cat can access the ball at all points in the interior space through the holes to impart forces to the ball, but the cat cannot remove the ball from the interior space through the holes.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
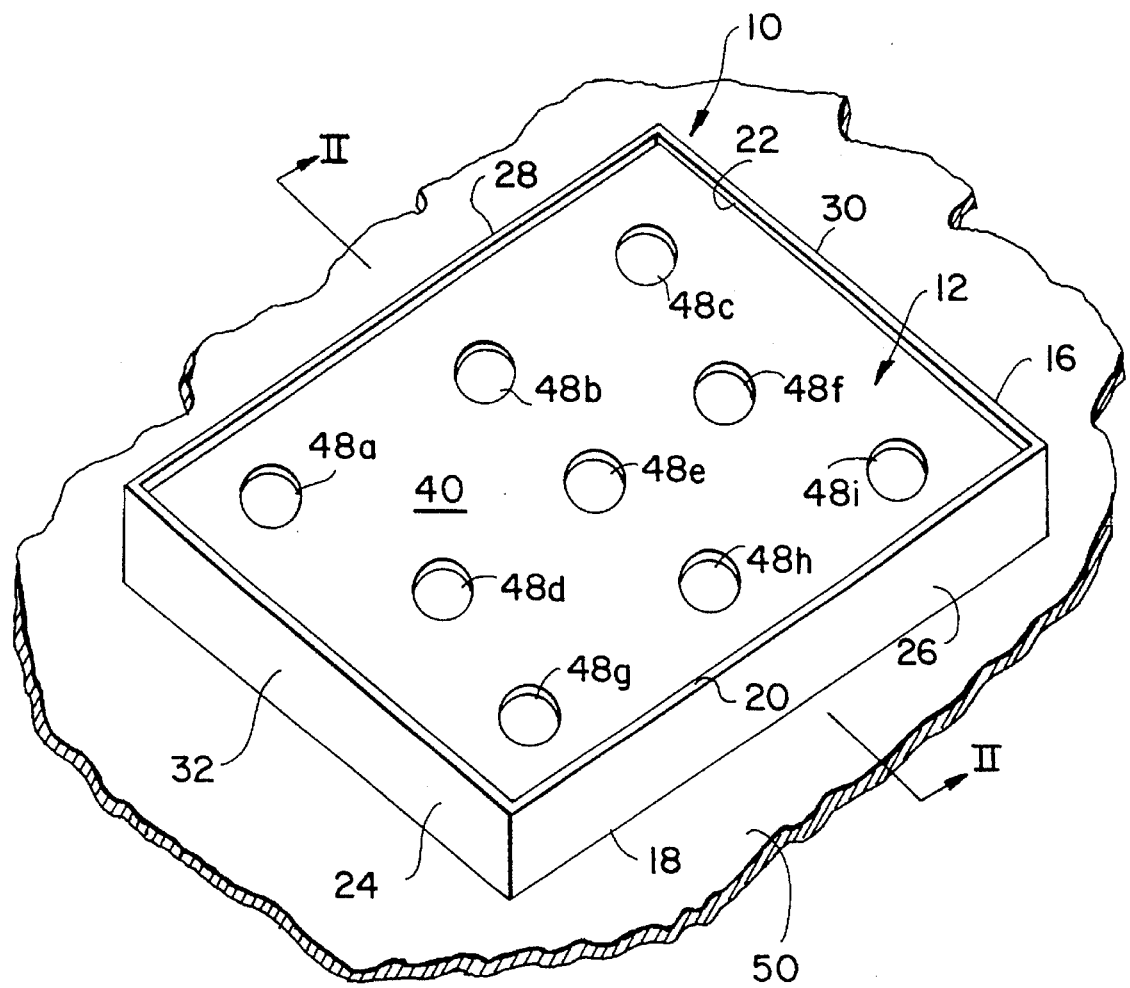
FIG. 1 is an isometric view of a cat game of this invention when supported on a horizontal support surface.

A cat game 10 comprises a rigid housing 12 and a ball 14, preferably a golf ball. The rigid housing 12 includes a peripheral, rigid, enclosed sidewall, or frame, 16 having a bottom edge 18, a top edge 20, an interior side 22, and an exterior side 24. In a preferred embodiment, the enclosed frame 16 is constructed of birch wood boards which are 3¼×¾ inches in cross section. In this preferred embodiment, the enclosed frame 16 is rectangular with its long sides 26 and 28 being a little more than 2 feet (24 inches) long and short sides 30 and 32 being a little more than 1½ feet (19 inches) long. In this preferred embodiment, four 3½×¾ inch birch boards are joined at corners of the enclosed frame 16 to form the enclosed frame 16. The interior side 22 of each of the boards has a bottom notch 34 and a top notch 36 therein, each of which is respectively immediately adjacent the bottom and top edges 18 and 20.

The rigid housing 12 further comprises a rigid flat bottom wall 38 and a rigid flat top wall 40. The bottom and top walls 38 and 40 have rectangular outer peripheries 42 and 44 which are rectangular, having dimensions of 1.5×2 feet. In this regard, the outer peripheries 42 and 44 of the bottom and top walls 38 and 40 are sized to be snugly, and permanently, received into the bottom and top notches 34 and 36 of the enclosed frame 16. Thus, the enclosed frame 16 and the bottom and top walls 38 and 40 define an interior space 46 therebetween. The bottom and top walls are preferably constructed of ¼ inch plywood with birch outer laminates thereon. Thus, substantially only birch can be seen when one uses the cat game 10 of this invention.

The top wall 40 has nine circular top openings, or holes, 48a–i therein. Each of these holes has a diameter of 2 inches, which is approximately ¼ inch greater than a diameter of the golf ball 14, which has an approximate diameter of 1¾ inches. It is important that the holes do not have a diameter greater than 1½ times of the diameter of the spherical ball, because if they did a cat might be able to retrieve the ball through one of openings from outside the rigid housing 12. When a golf ball is used, the opening should not be greater than 2½ inches and it cannot be less than 1¾ inches. It is preferable, however, that the hole be somewhat larger than the ball so that cats can have sufficient access to the ball that they can easily impart forces to it and can try to pull it through the holes.

It is desirable that a distance between the bottom and top walls 38 and 40 be substantially-uniform and approximately 2½ times the diameter of the ball 14. In the preferred embodiment, the ball 14 is approximately 1¾ inches in diameter and the distance between the top and bottom walls is 2½ inches. With a golf ball, the spacing should not be less than 2 inches and should not be greater than 3 inches. If the spacing is too small it is too easy for cats to reach the ball 14 and if it is too great it is too difficult for cats to reach the ball.

Corner holes 48a and 48g are spaced on center 3 inches from the nearest sides 26, 32, 28 of the enclosed frame 16 while the corner holes 48c and 48i are also spaced 3½ inches from their respective closest sides 28, 30, 26. The side holes 48b and 48h are centered along the length of the rigid housing 12 and are each spaced 4 inches from their respective closest sides 28, 26. The center hole 48e is centered on the top wall 40. End holes 48d and 48f are spaced 5½ inches from their respective closest sides 32, 30. Although these dimensions have been determined by trial and error to provide effective results, other arrangements of holes and dimensions could also be used.

Figure 2:
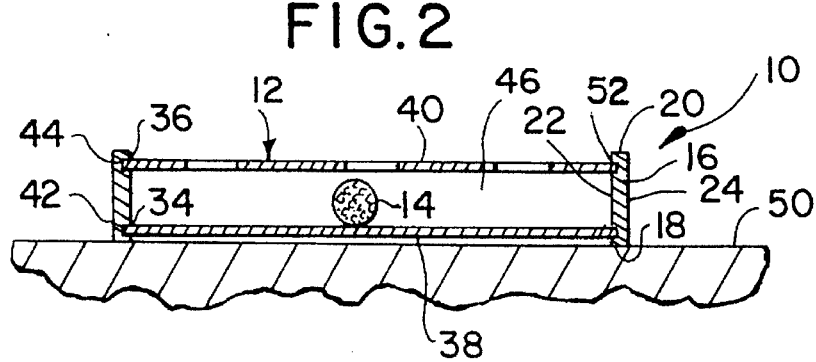
FIG. 2 is a cross sectional view taken on line II—II in FIG. 1.
Figure 3:
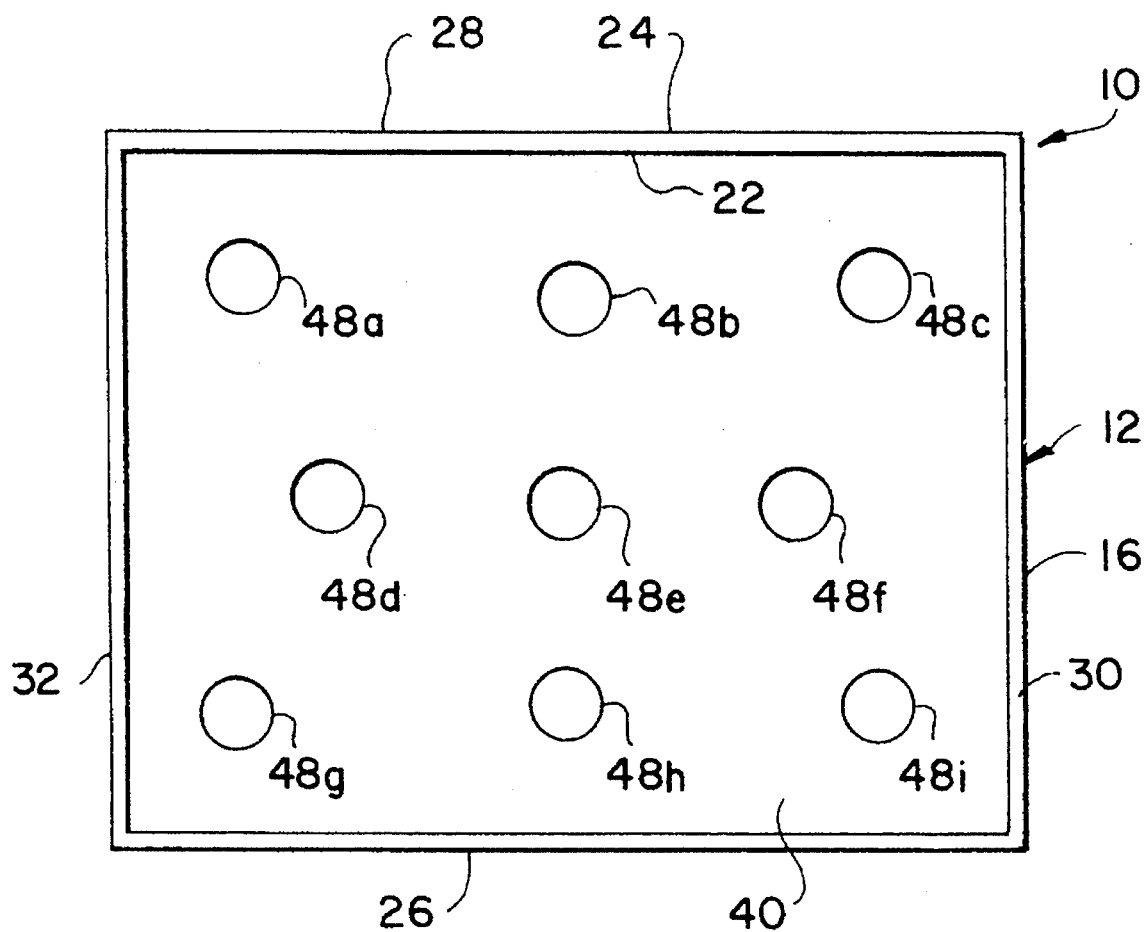
FIG. 3 is a top plan view of the cat game of FIG. 1.

It should be noted that holes are not placed immediately adjacent the enclosed frame 16. This is done intentionally so that the ball 14 can have areas close to the enclosed frame 16 in which to "hide". However, there is no place in the interior space 46 where a ball is out of reach from a cat of normal size and, as can be seen in FIG. 2, the interior space 46 and the holes 48 are substantially free of obstructions so that the ball 14 can freely roll on the bottom wall 38 throughout the interior space 46 and is not substantially obstructed from passing through the holes 48. It should also be noted that the corner holes 48a, 48g, 48c, and 48i are closer to sides of the enclosed frame 16 than are the side holes 48b, 48h and the end holes 48d and 48f. In this regard, it is sometimes difficult for a cat to retrieve the ball 14 from a corner. By placing the corner holes nearer to the enclosed frame 16 a cat can more easily retrieve a ball from a corner. The corner holes should not be further than 3¾ inches from walls forming corners and preferably they should not be greater than 3½ inches. On the other hand they should not be closer than 2½ inches to walls forming corners because the ball does tend to stop in corners and it is preferable that the ball be off-center from a hole when it stops. In this respect, cats seem to like to stretch their arms into the holes to reach the ball when it is off-center from a hole.

It is also desirable to have quite a few holes so that, as the ball 14 moves about the interior space 46, a cat sees the ball often as it passes under the various holes. On the other hand, if there were too many holes, it would be too easy for the cat to find the ball 14, which would reduce intrigue for the cat. If holes were placed immediately adjacent the enclosed frame 16 more holes would be needed than the nine holes 48a–i in the arrangement shown in the drawings, and this would be too many holes.

It would be possible to have a symmetrical arrangement of holes, with all of the outer holes being equidistant from the enclosed frame, however, such an arrangement would not compensate for the difficulty of retrieving a ball from a corner as does the depicted hole arrangement.

The reason the corner holes 48a and 48g could be closer to their respective corners than are the corner holes 48c and 48i could be to add variety to the game and thereby provide still more intrigue for a cat.

The dimensions of the bottom and top walls 38 and 40, that is, 2×1½ feet have been carefully chosen so that as many cat games as possible can be made from a standard 4×8 feet sheet of plywood, which is available "off the shelf". Although it is possible to make the rigid housing square, to do so would make the cat game less attractive, less space efficient, and less diverse for cats. It has been found that best results are achieved when nine holes are used, with most or all outer holes being substantially spaced from the enclosed frame 16.

In operation, the cat game is placed on a horizontal surface 50 (such as a floor), with the bottom edge 18 of the rigid housing 12 contacting the horizontal surface 50 to maintain the bottom and top walls 38 and 40 in parallel horizontal attitudes and spaced from the horizontal surface 50. Once the golf ball 14 is in the interior space 46, it can be seen by a cat from outside the rigid housing 12 through one of the holes 48a–i, either directly or at an angle. Cats normally, intuitively, try to reach the ball. When a cat touches the ball, the ball begins to roll, and because the bottom wall 38 is spaced from the horizontal surface 50, it creates a drum-like noise within the rigid housing 12 which stimulates the cat. In addition, when the ball rolls it usually passes some of the holes 48a–i and, when it does, the cat sees it and is thereby further stimulated. In this regard, the golf ball 14 also bounces off of the enclosed frame 16, thereby causing additional noise and making the ball go in another direction. This further stimulates the cat. Cats love to "chase" the ball via the holes and to try to "catch" it. When they do this, they cause further action of the ball which, in turn, creates further interest for the cat. However, cats cannot remove the ball through the holes. In this regard, although the ball will pass through the holes, as mentioned above, it is carefully dimensioned so that cats cannot remove the ball through the hole. Along the same line, the cat game 10 is sufficiently heavy so that a cat cannot turn it over to get the ball from the holes 48a–i.

While the invention has been particularly shown and described with reference to a preferred embodiment, it will be understood by those skilled in the art that various changes in form and detail may be made therein without departing from the spirit and scope of the invention. For example, although the rigid housing 12 of the cat game 10 described above is described as being made of wood, it would be possible to make it of resinous plastic as well as other materials. Further, as mentioned above, other hole arrangements and dimensions are possible within general outlines set forth above.

However, it is beneficial for the rigid housing 12 to be made of wood because when it is made of wood it has an aesthetically pleasing appearance and can be placed in any room in a house without detracting from the appearance of the room.

Similarly, it is desirable that the bottom and top walls 38 and 40 be spaced from the bottom and top edges 18 and 20 of the enclosed frame 16 because in this manner the rigid housing 12 has a drum-like shape so that noise is not significantly dampened by contact of the horizontal surface 50 with the bottom wall 38. Also, such a configuration provides a ¼ inch rail 52 about the exterior side of the top wall 40 for aiding a cat in orienting himself on the top wall 40. In this regard, experience has shown that cats enjoy playing on the cat game 10 so much that they often also sleep thereon so that they can "keep an eye" on the ball.

It is further beneficial to have nine holes 48a–i in the top wall 40. Nine holes provide what appears to be the most desirable access for cats to the ball 14. Fewer holes, for a properly sized housing, provide insufficient access because they leave "dead" spots and more holes provide too much access so that cats lose interest.

Still further it is desirable to use 2×1½ feet dimensions for the bottom and top walls to take advantage of available sizes of sheets of plywood, to conserve space, to provide a proper playing size for cats.

It is also desirable to use a heavy spherical ball, such as a golf ball, rather than a light ball, such as a ping-pong ball. Although a ping-pong ball will work in the cat game of this invention, it does not provide as much stimulation for cats. Since golf balls are heavier, they develop more momentum and can thereby be placed in motion for longer periods of time by one push than can lighter balls.

It is a benefit that both the bottom and top walls are made of a rigid material because this provides for standardization of parts and a redundancy of fabrication steps. Further, if the top wall were not of a rigid material, it could not be assured that cats could not retrieve the ball through the holes.

The embodiments of the invention in which an exclusive property or privilege are claimed are defined as follows:

1. A method of entertaining a cat comprising the steps of:

providing the following structure:

a rigid enclosed frame having bottom and top edges and interior and exterior sides, said interior sides defining an interior space;

a rigid flat bottom wall having a perimeter edge attached to said frame adjacent said bottom edge of said frame for enclosing said interior space adjacent said bottom edge of said frame;

a rigid flat top wall having a perimeter edge attached to said frame for enclosing said interior space adjacent said top edge of said frame, said top wall having a plurality of spaced holes therein and being spaced a substantially uniformed distance from said flat bottom wall; and a spherical ball in said interior space;

wherein said distance between said flat bottom and top walls, and the size and spacings of said top holes are such that said ball can pass through most of said top holes, and such that a cat located outside of said exterior space has access to said ball through said holes for imparting a force to said ball, but such that said cat cannot remove said ball through said holes; and wherein said interior space and holes are substantially free of obstructions so that said ball can freely roll on said bottom wall throughout said interior space defined by the interior side of said rigid enclosed frame and is not substantially obstructed from passing through said holes;

supporting said structure on a horizontal support surface with said bottom edge being adjacent said horizontal support surface and the flat bottom and top walls each being substantially parallel with each other and with the horizontal support surface;

allowing a cat to insert its paws through said holes and impart a force to said ball.

* * * * *